United States Patent Office

2,721,199
Patented Oct. 18, 1955

2,721,199

PRODUCTION OF AMIDES OR LACTAMS FROM OXIMES

Melvin L. Huber, Pitman, N. J., assignor to E. I. du Pont de Nemours and Company, Wilmington, Del., a corporation of Delaware No Drawing. Application December 15, 1953, Serial No. 398,417

6 Claims. (Cl. 260—239.3)

The present invention relates to a process for the rearrangement of oximes to the corresponding amides. More particularly, this invention relates to a novel medium for the rearrangement of oximes.

The rearrangement of oximes to the corresponding amide by means of the Beckmann rearrangement utilizing concentrated sulfuric acid as the rearrangement medium and catalyst is well known. The process is widely used in the preparation of caprolactam from cyclohexanone oxime. The rearrangement reaction is highly exothermic, and efficient heat removal means are essential to control this reaction. Such heat removal is normally obtained by the use of cooling coils located in the reactor. Because of the corrosive action of the concentrated sulfuric acid, and the complication of the equipment produced by the use of internal cooling coils, the desirability of an alternative medium has long been known.

An object of the present invention is to provide a process of rearranging an oxime to the corresponding amide wherein sulfuric acid is not used as the rearrangement medium. A further object is to provide a process for the rearrangement of oximes wherein the rearrangement medium facilitates control of the reaction temperature. Additional objects will become apparent as this invention is more fully described.

I have found that the foregoing objects are achieved when I use trifluoroacetic acid as the rearrangement medium and catalyst for the Beckmann rearrangement. Trifluoroacetic acid has a boiling point of 72.4° C., and is volatilized at the reaction temperature of the rearrangement. The volatilization of the trifluoroacetic acid removes efficiently the heat of reaction, and the reaction can be readily controlled by refluxing this medium.

In order to more fully describe the present invention, reference is made to the following examples. In the examples, parts are by weight.

*Example I*

A solution of 100 parts of cyclohexanone oxime in 225 parts of trifluoroacetic acid (the solution was made in cold acid) was added slowly to 165 parts of boiling trifluoroacetic acid during a period of 2.5 hours. The reaction mixture temperature increased from the boiling temperature of the acid (72.4° C.) to about 114° C. About one-half hour after the addition of the last of the solution, the excess trifluoroacetic acid was removed under reduced pressure and the residual product was dissolved in water and neutralized with aqueous ammonia. The solution was saturated with ammonium sulfate, extracted with chloroform, and the extract distilled under reduced pressure, producing 82 parts (82% yield) of caprolactam (B. P. 100–101° C. at 0.9 mm. Hg.).

*Example II*

A solution of 20 parts of cyclohexanone oxime in 96 parts of trifluoroacetic acid was heated carefully. At a temperature of about 90° C., the mixture began to reflux; rearrangement began to take place rapidly at about 95° C. and the temperature rapidly rose to about 110° C. where it remained constant until the reaction diminished. After separation by methods similar to those described in Example I, 17.3 parts (87% yield) of caprolactam was recovered. The product melted at 67–68° C. after recrystallization.

*Example III*

A solution of 25 parts of acetophenone oxime in 60 parts of trifluoroacetic acid was added slowly to 38 parts of boiling trifluoroacetic acid. The reaction temperature increased from 72.4° C. to 108° C. After digestion for about one-half hour, the excess acid was removed under reduced pressure, and the residue was recrystallized from a methanol-water mixture to obtain 22.8 parts of acetanilide, a yield of 91% of theory.

*Example IV*

A solution of 25 parts butyraldoxime in 45 parts of trifluoroacetic acid was added to 53 parts of boiling trifluoroacetic acid during 15 minutes. After digestion for about 20 minutes, the excess acid was removed by distillation at atmospheric pressure and the residue was neutralized with aqueous ammonia. The solution was saturated with ammonium sulfate, extracted with chloroform, and the extract was evaporated to obtain crude butyramide. After recrystallization from ether, the product melted at 114–115° C.

As is illustrated in the examples, the use of trifluoroacetic acid as the medium for the rearrangement of an oxime to the corresponding amide permits excellent control of the reaction temperature and eliminates the requirement of internal cooling means in the reactor. The reaction temperature is controlled by the reflux conditions, and will preferably be held between 72° C. and 115° C. The reaction requires a slight molar excess of the trifluoroacetic acid, for example, 1.2 moles of trifluoroacetic acid per mole of oxime. Increasing the trifluoroacetic acid ratio permits increased control of the reaction temperature, particularly in the late stages of the reaction when amide-acid complexes having relatively high boiling points may reduce the trifluoroacetic acid available for refluxing. The excess acid can readily be recovered by distillation from the reaction mixture.

The examples illustrate the application of the present process to the rearrangement of cyclohexanone oxime, acetophenone oxime and butyraldoxime. The process is applicable generally to the rearrangement of both ketoximes and aldoximes.

The present invention has been fully described in the foregoing. I intend, therefore, to be limited only by the following claims.

I claim:

1. A process for the preparation of organic amides which comprises refluxing the corresponding oxime in trifluoroacetic acid.

2. A process for the preparation of caprolactam which comprises refluxing cyclohexanone oxime in the presence of trifluoroacetic acid.

3. A process as claimed in claim 2 wherein the trifluoroacetic acid is present in a ratio of at least 1.2 mole of trifluoroacetic acid per mole of cyclohexanone oxime.

4. A process as claimed in claim 2 wherein the refluxing is performed at a temperature between 72° C. and 115° C.

5. A process for the preparation of acetanilide which comprises refluxing acetophenone oxime in the presence of trifluoroacetic acid.

6. A process for the preparation of butyramide which comprises refluxing butyraldoxime in the presence of trifluoroacetic acid.

(References on following page)

References Cited in the file of this patent

UNITED STATES PATENTS

| | | |
|---|---|---|
| 2,221,369 | Cass | Nov. 12, 1940 |
| 2,234,566 | Lazier et al. | Mar. 11, 1941 |
| 2,249,177 | Schlack | July 15, 1941 |
| 2,313,026 | Schlack | Mar. 2, 1943 |
| 2,423,200 | Moncrieff et al. | July 1, 1947 |
| 2,573,374 | Wichterle | Oct. 30, 1951 |

OTHER REFERENCES

Overend, Chem. Abstracts, vol. 46, pp. 1994–5 (1952).

"Newer Method of Prep. Org. Chem.," (Interscience), pp. 343–4 (1948).